United States Patent [19]

Penneck

[11] Patent Number: 4,521,549

[45] Date of Patent: * Jun. 4, 1985

[54] HIGH VOLTAGE INSULATING MATERIALS

[75] Inventor: Richard J. Penneck, Lechlade, England

[73] Assignee: Raychem Corporation, Menlo Park, Calif.

[ * ] Notice: The portion of the term of this patent subsequent to Aug. 16, 2000 has been disclaimed.

[21] Appl. No.: 522,821

[22] Filed: Aug. 12, 1983

Related U.S. Application Data

[63] Continuation of Ser. No. 109,249, Jan. 3, 1980, Pat. No. 4,399,064, which is a continuation of Ser. No. 434,126, Jan. 17, 1974, abandoned, which is a continuation-in-part of Ser. No. 81,558, Jan. 16, 1970, abandoned.

[30] Foreign Application Priority Data

Oct. 17, 1969 [GB] United Kingdom ............... 51119

[51] Int. Cl.$^3$ ............... C08G 47/00; H01B 3/00; C04B 35/10
[52] U.S. Cl. ............... 523/173; 174/110 S; 174/110 E; 174/DIG. 1; 427/117; 524/403; 524/406; 524/407
[58] Field of Search ............... 523/173; 174/110 S, 174/110 E, DIG. 1; 427/117; 524/403, 406, 407

[56] References Cited

U.S. PATENT DOCUMENTS

| | | |
|---|---|---|
| 2,997,526 | 8/1961 | Kessel et al. ............ 174/DIG. 1 X |
| 3,044,900 | 7/1962 | Ford . |
| 3,110,623 | 11/1963 | Field . |
| 3,206,330 | 9/1965 | Chottiner . |
| 3,626,083 | 12/1971 | Minter et al. ............ 174/110 |
| 4,399,064 | 8/1983 | Penneck ............ 523/173 |

FOREIGN PATENT DOCUMENTS

| | | |
|---|---|---|
| 757659 | 4/1971 | Belgium . |
| 666517 | 7/1963 | Canada ............ 174/DIG. 1 |
| 889898 | 1/1972 | Canada . |
| 2050581 | 4/1971 | Fed. Rep. of Germany . |
| 7037393 | 4/1971 | France . |
| 909022 | 3/1972 | Italy . |
| 122629 | 7/1973 | Mexico . |
| 7015250 | 4/1971 | Netherlands . |
| 706997 | 6/1971 | South Africa . |
| 595569 | 6/1944 | United Kingdom . |
| 1337951 | 11/1973 | United Kingdom . |
| 1337952 | 11/1973 | United Kingdom . |
| 29149 | 3/1973 | Venezuela . |

OTHER PUBLICATIONS

Potter, Pigment Handbook, J. Wiley & Sons, (1969), pp. 296, 298–299, 301, 302.
Chem. Absts., vol. 67, col. 109429, vol. 75, col. 37628k.
Alcoa, Alumina Properties, Tech. Paper, #10, (1960), p. 66, Aluminum Co. of Am.

*Primary Examiner*—John D. Welsh
*Attorney, Agent, or Firm*—James G. Passé; Edith A. Rice; Herbert G. Burkard

[57] ABSTRACT

Tracking is reduced in insulators comprising one or more polymers and an anti-tracking filler system comprising (a) a hydrate of alumina having a specific surface area of at least 2 m$^2$/g measured by the BET method, and (b) a compound selected from the group consisting of oxides, mixed oxides and mixtures of oxides wherein said compound contains at least one element selected from the group consisting of transition series elements, lanthanide series elements and nontransuranic actinide series elements.

40 Claims, No Drawings

HIGH VOLTAGE INSULATING MATERIALS

This is a continuation of application Ser. No. 109,249 filed Jan. 3, 1980, now U.S. Pat. No. 4,399,064, which is a continuation of then pending application Ser. No. 434,126, filed Jan. 17, 1974 and now abandoned which in turn was a continuation-in-part of my then pending application Ser. No. 81,558 filed Oct. 16, 1970 and now abandoned.

BACKGROUND OF THE INVENTION

This invention relates to high-voltage insulating materials.

While polymeric materials are widely used for insulating a wide variety of electrical apparatus, they are not suitable for high voltage applications in contaminated atmospheres where moisture or fog, together with salts, dust particles and ionic pollution causes leakage currents to flow across the surface of the insulation. This current causes a rise in temperature with consequent moisture evaporation and ultimately dry band formation. The electrical stress across these dry bands often exceeds the breakdown stress of the air-insulation interface, so that discharge or spark scintillation takes place. The spark temperature is extremely high, often 2000° C. or higher, and the heat produced may be sufficient to cause degradation of the insulation surface with the ultimate formation of carbonaceous spots. These carbonaceous spots usually link up in dendritic fashion and the organic insulation fails by progressive creepage tracking.

Over the years many solutions to these problems have been proposed of which perhaps the most effective has been the incorporation of hydrated alumina, preferably the trihydrate, in fairly substantial quantities to for example butyl rubber, epoxy resins, especially of the cycloaliphatic type, and, more recently, to ethylene-propylene rubbers as illustrated in U.S. Pat. Nos. 2,997,526; 2,997,527; and 2,997,528.

There have been several suggested modes of operation for the hydrated alumina, but whatever the correct mechanism, it is found in practice that polymeric materials containing large proportions of alumina trihydrate are substantially protected against tracking and usually fail only by progressive surface erosion. The amount of alumina hydrate required to produce the anti-tracking effect is very high, however, and is usually in the region of 50–90% by weight of the entire insulation. Especially in the case of polymers that are shaped by molding or extrusion as well as in the field of heat-recoverable articles, the high filler content is undesirable because the high temperature used and/or the radiation employed in cross-linking cause loss of the hydrated water with accompanying development of porosity and the formation of voids leading ultimately to failure of the insulation.

SUMMARY OF THE INVENTION

The present invention provides an electrically insulating material which comprises one or more polymers and an anti-tracking filler system comprising, (a) a hydrate of alumina have a specific surface area of at least about 2 $m^2/g$, and (b) a compound from the group consisting of oxides, mixed oxides and mixtures of oxides wherein said compound contains at least one element from the transition elements, the lanthanide series or the nontransuranic actinide series, as defined hereinafter.

"The resulting electrically insulating material has an initial tracking voltage of at least 2.5 kilovolts when tested according to ASTM-D 2303-68 liquid contaminant incline plane test, incorporated herein by reference."

By a "transition element" there is herein meant the elements of sub-groups IVa, Va, VIa, VIIa, and Group VIII of Mendeleef periodic table which are not also in the nontransuranic actinide series, e.g., titanium, zirconium, and hafnium; vanadium, niobium, and tantalum; chromium, molybdenum and tungsten; manganese, technetium, and rhenium; and iron, cobalt, nickel, ruthenium, rhodium, palladium, osmium, iridium and platinum.

By "lanthanide series" there is herein meant the elements cerium, praseodymium, neodymium, promethium, samarium, europium, gadolinium, terbium, dysprosium, holmium, orbium, thulium, ytterbium and lutetium.

By "nontransuranic actinide series" there is herein meant the elements thorium, protactinium, and uranium.

DESCRIPTION OF PREFERRED EMBODIMENTS

All references to "specific surface area" in this specification are to that measured by the Brunauer, Emmett and Teller (BET) nitrogen absorption method assuming the area covered by a nitrogen molecule to be 16.2 $Å^2$. (The BET method is referred to, for example, in "The Physics and Chemistry of Surfaces" by N. K. Adam published by Dover, and in "Solid Surfaces and the Gas-Solid Interface", Advances in Chemistry Series Vol. 33).

The alumina hydrate is preferably the trihydrate, $Al_2O_3.3H_2O$, and preferably constitutes a major amount of the anti-tracking filler system.

It has surprisingly been found that the use of alumina hydrate of high surface area greatly enhances the properties of the insulating compositions of the present invention. It is preferable for the specific surface area of the alumina hydrate to be at least 3 $m^2/g$ and advantageously greater than 6 $m^2/g$. Especially good results are obtained when the specific surface area lies in the range of from 8 to 20 $m^2/g$. Lower surface areas will still yield acceptable results. However, the surface area should not be below about 2.0 $m^2/g$ to obtain the surprising improvement in insulating properties disclosed herein.

The hydrated alumina advantageously has a maximum particle size less than about 4 microns and preferably less than about 2 microns. Since the specific surface area of hydrated alumina is not directly dependent on particle size, it is understood that the invention is not limited to a particular particle size range.

The specific surface areas and particle size distributions of two forms of alumina trihydrate suitable for use in the present invention are given below.

|  | A | B |
| --- | --- | --- |
| weight % less than 2 microns | 100 | 100 |
| weight % less than 1 micron | 99.5 | 80 |
| weight % less than 0.5 micron | 60 | 21 |
| specific surface area $m^2/g$ | 12–15 | 6–8 |

Types A and B are sold by the Aluminum Company of America as "Hydral 705" and "Hydral 710", respectively. It is to be noted that the above surface areas are those claimed by Alcoa. Actual surface areas for samples of A have been found to vary from 6 to 21 m$^2$/g, averaging about 12 m$^2$/g.

Hydral 705 gives generally good results when used in the anti-tracking systems of the present invention, especially when the surface area is 10 m$^2$/g or higher.

Alumina hydrate of the desired specific surface area may be prepared by methods known per se, for example, by dissolving alumina in caustic soda and then re-precipitating it by bubbling carbon dioxide through the solution. According to the pH and the rate of bubbling, the necessary values of which can easily be determined by experiment, alumina hydrate of the desired specific surface area can be obtained.

Among oxides, mixed oxides and mixtures suitable as component (b) there may be mentioned, for example, (i) Transition metal oxides, for example, $TiO_2$, $V_2O_5$, $Cr_2O_3$, $Fe_2O_3$, $NiO_2$, $Ni_3O_4$, $Co_2O_3$, $Co_3O_4$, $MoO_3$, $WO_3$, $Nb_2O_5$, and mixtures thereof.

(ii) Lanthanide series oxides, for example, $Pr_6O_{11}$, $Yb_2O_3$, $Ce_2O_3$, holmium oxide, erbium oxide, and mixtures thereof.

(iii) Nontransuranic actinide series oxides, for example, $UO_3$, $ThO_2$ and mixtures thereof.

(iv) Mixed oxides containing one or more transition metals, for example, nickel titanate, nickel molybdate and cobalt silicate.

(v) Any of the above oxides, mixed oxides or mixtures carried on an ahydrous alumina support, e.g., nickel cobalt molybdate on alumina and cobalt oxide on alumina $CoO.Al_2O_3$ (blue cobalt aluminate).

(vi) Any of the above systems doped with small quantities of alkali metal or alkaline earth metal oxides, especially $Li_2O$ and $K_2O$.

It is understood that the above listing is illustrative only, and is not intended to be a complete list of all the oxides which are operable in the invention.

The component (b), which is believed to react synergistically with the alumina hydrate in reducing tracking, may in some cases be used in quantities down to or below 0.5% by weight based on the total weight of the insulation material, but in general is preferably present in an amount in the range of from 2 to 10%, especially from 3 to 5%. Although amounts higher than 10% may be employed, little additional benefit to the tracking and erosion properties is gained thereby with most oxides. However, with some oxides of the invention e.g., $ThO_2$, the oxide is preferably present in quantities of about 15% or more by weight.

The particle size and surface area of component (b) are not so important as that of the alumina hydrate but the best results appear to be obtained with materials having a particle size less than 75 microns (BS 200 mesh, U.S. Sieve No. 200) and, for ease of dispersion during preparation of the insulating material, it is preferable to use materials having a particle size less than 45 microns (B.S. 350 mesh, U.S. Sieve No. 325).

Compounds of iron, cobalt and chromium are especially preferred as component (b). Particularly good results are obtained when $Co_3O_4$ is used as component (b). Ferric oxide, cobaltic oxide and chromic oxide are also very useful.

It has also been found that a given weight of some combinations of two or more substances as component (b) is more effective than the same weight of only one of the substances, i.e. a synergistic effect between the substances is noted. An especially good component is a mixture of $Fe_2O_3$ and $Co_2O_3$. Insulating materials incorporating a given weight of this mixture show substantially less erosion on testing than materials incorporating an equal amount of either $Fe_2O_3$ or $Co_2O_3$ alone.

One of the problems of the previously proposed anti-tracking compositions in which alumina hydrate is used alone has been the difficulty of obtaining good U.V. stability. Normally, for maximum weather and U.V. protection it is common practice to incorporate small quantities of carbon blacks, usually the channel type. Alternatively, organic U.V. absorbers such as, for example, substituted benzophenones or benzotriazoles are employed which are far less effective than carbon black, although they have the advantage that a variety of colors are obtainable using normal pigments. In the case of polymeric insulating materials for outdoor use, a lifetime exposure running into decades, typically 25-30 years, is required. Some polymeric insulating materials are not sufficiently U.V. stable to last this length of time and it is therefore necessary to incorporate channel blacks into them. The effect of these channel blacks, even in small concentrations of the order of 0.3% or less, has, however, been catastrophic on the previously proposed insulation materials in that tracking failures have rapidly occurred.

One of the surprising features of the present invention is that carbon black fillers can be incorporated into the insulation, in amounts up to about 3% by weight, without failure by progressive creepage tracking occurring such materials failing only by erosion. This is obviously a very important advantage particularly where the base polymers do not have good U.V. resistance.

In general, the anti-tracking filler system will constitute from 20-75% of the total weight of the insulating material. However, owing to the synergistic effect between component (b) and the alumina hydrate it is possible to reduce the proportion to below 20% in some cases without loss of anti-tracking properties. This is especially useful in the formation of heat-shrinkable articles from the materials when proportions of from 20 to 35% are preferred to avoid the development of porosity during manufacture and to maintain the necessary elongation, modulus and tensile strength above the crystalline melting point. If the material is to be used in non-heat-shrinkable applications then it is preferred to increase the proportion of alumina hydrate since this effectively reduces erosion rates and also lessens the overall cost of the insulation. The preferred proportion of anti-tracking filler system (a) plus (b) thus falls within the range of from 30 to 60% of the total weight of the insulation in these cases.

In general any polymer normally used for high voltage insulation may be used in this invention. Among polymeric materials into which the anti-tracking system may be incorporated there may be mentioned polyolefins and other olefin polymers, obtained from two or more monomers especially terpolymers, polyacrylates, silicone polymers and epoxides, especially cycloaliphatic epoxides. Among epoxide resins of the cycloaliphatic type there may especially be mentioned those sold commercially by CIBA (A.R.L.) limited under the names CY 185 and CY 183. Particularly suitable polymers include polyethylene, ethylene/ethyl acrylate copolymers, ethylene/vinyl acetate copolymers, ethylene/propylene copolymers, ethylene/propylene non-conjugated-diene terpolymers, chlorosulphonated polyethylene, polypropylene, polydimethyl siloxane, dimethyl siloxane/methyl vinyl siloxane copolymers, fluoro silicones, e.g. those derived from 3,3,3-trifluoropropyl siloxane, carborane siloxanes, e.g. "Dexsil" polymers made by Olin Mathieson, polybutyl acrylate butyl-/ethyl acrylate copolymers, butyl acrylate/acrylonitrile copolymers, butyl acrylate/glycidyl methacrylate copolymers, polybutene, butyl rubbers, ionomeric polymers, e.g. "Surlyn" materials sold by DuPont, or mixtures of any two or more of the above.

The present invention also provides a composition suitable for processing into the insulating material of the invention.

The present invention furthermore provides as anti-tracking filler system suitable for use in the insulating materials and compositions of the invention.

The present invention also provides an electrical component especially a cable, insulated by the insulating material of the invention.

The present invention also provides a shaped article made from an insulating material of the invention. The material may be cross-linked and, if desired, the property of heat-recoverability may be imparted to the article.

Among the many uses for the insulating materials of the present invention there may especially be mentioned the production of heat-shrinkable tubing, heat-shrinkable sheds and heat-shrinkable 3-core udders for cable connection and termination, especially at high voltages of up to 33 KV and higher (vide "Heat-shrinkable plastics for termination and jointing of power and auxiliary cables" D. Q. Ash, I. Bagdzinski and R. J. T. Clabburn PROC.IEE Vol. 117, No. 7, July 1970 pp 1365–1372). These and other shaped parts are especially useful in the termination of high voltage cables to overhead lines, to transformers and to switchgear, especially in outdoor environments.

The insulating material of the present invention may also in some cases advantageously be applied to, for example, a termination in situ by application of the basic composition in the form of a lacquer in a suitable solvent, for example, toluene, xylene or carbon tetrachloride. In some cases, especially when the polymer component is a silicone, the composition may itself be sufficiently fluid for in situ application which will harden on standing.

It will be appreciated that although the primary purpose of the anti-tracking filler is to prevent creeptracking as outlined above, the materials will also be effective in stabilizing the insulation under arcing conditions, i.e. in cases where a direct arc passes between two parts of an electrical apparatus forming a carbonaceous track along its line. This phenomenon is slightly different from creep-tracking where, for example conducting contaminate and/or surface irregularities cause a leakage current and a dendritic carbonaceous path develops on the surface of the insulation.

The insulating material and compositions of the present invention may, if desired, contain other fillers, for example, flame retardants, reinforcing fillers, pigments and mixtures thereof.

The anti-tracking system can be incorporated into polymer(s) by any of the commonly used techniques, for example, in a twin-roll mill at elevated temperatures. Similarly the resulting compositions can readily be processed into sheets of material or other shaped articles by any of the usual methods.

The following examples illustrate the invention, parts and percentages being by weight unless otherwise stated. The surface area of the alumina trihydrate is 16.0 $m^2/g$ unless otherwise indicated.

EXAMPLE 1

The following formulations were prepared by compounding on a twin-roll mill:

| Sample No. | 1 | 2 | 3 | 4 | 5 | 6 | 7 |
|---|---|---|---|---|---|---|---|
| Dimethyl silicone elastomer (containing a small amount of methyl vinyl siloxane) | 30 | 30 | 30 | 30 | 30 | 30 | 30 |
| Low density polyethylene (MFI 3) | 30 | 30 | 30 | 30 | 30 | 30 | 30 |
| Ethylene ethyl acrylate copolymer (19% ethyl acrylate) | 30 | 30 | 30 | 30 | 30 | 30 | 30 |
| Alumina trihydrate (Hydral 705) | 30 | 60 | 30 | 45 | 60 | — | — |
| Agerite Resin D (polymerized trihydroquinaline oxidant) sold by Vanderbilt | 2 | 2 | 2 | 2 | 2 | 2 | 2 |
| Calcined ferric oxide | 5 | 5 | — | — | — | 5 | 30 |
| Triallyl cyanurate | 1 | 1 | 1 | 1 | 1 | 1 | 1 |
| 2,5-dimethyl 2,5-di-t-butyl peroxy hexyne-3 | 1 | 1 | 1 | 1 | 1 | 1 | 1 |

After thoroughly mixing all the ingredients in the order given, plaques 5×2×0.25 inches were pressed at 200° C. for 10 mins. The cross-linked plaques were then tested according to the ASTM D 2303-68 liquid contaminant inclined plane test which measures the tracking and erosion resistance of insulating materials. The test method used was the initial tracking voltage test in which the voltage is raised by 0.25 KV every hour and was identical to the ASTM test except that the voltage supply was 50 HZ and no silver paint was used in conjunction with the stainless steel electrodes. The silver paint is not necessary and its absence has no effect on the test result. The samples were used for testing approximately 24 hours after preparation and were stored at room temperature and humidity. They were not soaked in contaminant prior to test. The contaminant which was ammonium chloride had a resistivity of 380 ohm. cm. and contained 0.02% Triton X100 as wetting agent.

The results of the tests are given in Table 1.

Comparision of the results of the tests on Samples 1 to 7 clearly shows that whereas Samples 6 and 7 containing ferric oxide but no alumina hydrate track rapidly, and Samples 3, 4 and 5 containing alumina hydrate but no ferric oxide track after a relatively short period, Samples 1 and 2 containing both alumina hydrate and ferric oxide in accordance with the present invention are non-tracking and fail only by erosion after 200 and 270 minutes on test, respectively.

The results of the tests on Samples 3, 4 and 5 illustrate that in the absence of ferric oxide as component (b), an increased proportion of alumina hydrate does not prevent tracking.

The results of the tests on Samples 6 and 7, similarly show that, in the absence of alumina hydrate, an increased proportion of ferric oxide does not prevent tracking.

The results of the tests on Samples 1 and 2 show clearly the synergistic anti-tracking effect of a combination of alumina hydrate and ferric oxide.

A further experiment was carried out on Sample 1 to evaluate the rate of erosion. In this experiment, the voltage was maintained constant at 2 KV, and the contaminant contained 1% sugar in addition to the ammonium chloride. After 24 hrs. exposure to the scintillation a very small depression about 0.050 in. deep had eroded away, showing the extremely good erosion resistance. By comparison, Sample 3 tracked, under the same conditions after 150 minutes.

TABLE 1

| Sample No. | 1 | 2 | 3 | 4 | 5 | 6 | 7 |
|---|---|---|---|---|---|---|---|
| Start up voltage KV | 3.0 | 3.0 | 3.0 | 3.0 | 3.0 | 3.0 | 3.0 |
| Final voltage KV | 3.75 | 4.0 | 3.25 | 3.5 | 3.5 | 3.0 | 3.0 |
| Tracking voltage KV | non tracking | non tracking | 3.25 | 3.5 | — | 3.0 | — |
| Time to track 2" (minutes from start of test) | — | — | 69 | 120 | 130 | 8 | 14 |
| Comments | Sample eroded through at base after 200 mins. on test. | Sample eroded through at base after 270 mins. on test. | Narrow tracks with slight tendency to dendritic tracking noted. | Sample tracks, but then tended to "clean up" leaving a large deep erosion crater in the sample. | Sample eroded rapidly with some tracking then "cleaned up", subsequently tracking again. | Substantially immediate tracking. | Substantially immediate tracking. |

EXAMPLE 2

Test samples containing the following formulations were prepared as described in Example 1.

| Sample No. | 8 | 9 |
|---|---|---|
| Dimethyl silicone elastomer (as in Example 1) | 30 | 30 |
| Low density polythene (as in Example 1) | 30 | 30 |
| Ethyleneethyl acrylate copolymer (as in Example 1) | 30 | 30 |
| Alumina trihydrate Hydral 705 | 30 | 30 |
| Agerite Resin D (antioxidant) | 2 | 2 |
| Calcined ferric oxide | 5 | — |
| Kosmos BB (a conducting carbon black) | 1 | 1 |
| Triallyl cyanurate | 1 | 1 |
| 2,5-dimethyl-2,5-di-t-butyl-peroxy hexyne-3 | 1 | 1 |

The following results were obtained using the test method described in Example 1.

| Sample No. | 8 | 9 |
|---|---|---|
| Start up voltage, kV | 1.5 | 1.5 |
| Final voltage | 3.75 | 2.0 |
| Tracking voltage | Non-tracking | 2.0 |
| Comments. | Sample eroded at bottom electrode after 576 minutes of test. | Sample tracked after 125 minutes on test. |

EXAMPLE 3

Samples containing the following formulations were prepared and tested as in Example 1.

All samples contained 30 parts dimethyl silicone elastomer, 30 parts low density polyethylene, 30 parts ethylene/ethyl acrylate copolymer, 30 parts alumina trihydrate (Type A), 2 parts Agerite Resin D, 1 part triallyl cyanurate and 1 part 2,5-dimethyl-2,5-di-t-butyl peroxy hexyne-3.

In Addition, Samples 10–19 contained 5 parts of the following components, respectively:

| Sample 10. | $NiO_2$ |
| Sample 11. | $Ni_3O_4$ |
| Sample 12. | $Co_2O_3$ |
| Sample 13. | $Co_3O_4$ |
| Sample 14. | $Cr_2O_3$ |
| Sample 15. | $V_2O_5$ |
| Sample 16. | $TiO_2$ (surface area 250 m$^2$/g) |
| Sample 17. | $MoO_3$ |
| Sample 18. | $WO_3$ |
| Sample 19. | $Nb_2O_5$ |

Sample 20 additionally contained a mixture 5 parts $Fe_2O_3$ and 5 parts $Co_2O_3$.

The results of the tests are shown in TABLE 2. It will be seen that Samples 13, 14, 16 and 20 gave especially good results and that all the samples show substantially better anti-tracking properties than Samples 3, 4 and 5, which contained only alumina hydrate.

| Sample No. | 10 | 11 | 12 | 13 | 14 | 15 |
|---|---|---|---|---|---|---|
| Start up voltage KV | 3.0 | 3.0 | 3.0 | 3.0 | 3.0 | 3.0 |
| Final voltage KV | 3.5 | 3.75 | 4.0 | 5.25 | 4.25 | 3.25 |
| Tracking voltage KV | non-tracking | non-tracking | non-tracking | non-tracking | non-tracking | non-tracking |
| Comments | Eroded through at base after 165 mins. | Sample eroded slowly removed from test owing to flaming of surface only partly eroded. | Eroded through at base after 265 mins. | Substantially no erosion even after 580 mins. | Slow erosion failed by flaming after 320 mins. | Sample eroded through at base after 106 mins. |

| Sample No. | 16 | 17 | 18 | 19 | 20 |
|---|---|---|---|---|---|
| Start up voltage KV | 3.0 | 3.0 | 3.0 | 3.0 | 3.0 |
| Final voltage KV | 5.25 | 3.75 | 3.75 | 3.25 | 5.0 |
| Tracking voltage KV | non-tracking | 3.75 | non-tracking | non-tracking | non-tracking |
| Comments | Sample failed | Sample failed | Sample ero- | Eroded through | Very slow |

|   |   |   |   |   |
|---|---|---|---|---|
| by surface flaming after 588 mins. | by small track in middle of speciman. | ded through at base after 200 min. | at base after 96 mins. | erosion. Sample hardly marked when test discontinued at 529 mins. |

EXAMPLE 4

Samples containing the following formulations were prepared and tested as described in Example 1. The results are shown in Table 3.

| Sample No. | 21 | 22 | 23 | 24 |
|---|---|---|---|---|
| Ethylene ethyl acrylate copolymer (as in Example 1) | 200 | 200 | 100 | 100 |
| Ethylene-propylene-ethylidene norbornene terpolymer | 80 | 80 | 80 | 80 |
| Low density polythene (as in Example 1) | — | — | 100 | 100 |
| Alumina hydrate (Hydral 705) | 110 | 110 | 110 | 110 |
| Agerite Resin D | 5 | 5 | 5 | 5 |
| Triallyl cyanurate | 3 | 3 | 3 | 3 |
| 2,5-di methyl 2,5-di tert. butyl peroxy hexyne-5 | 2 | 2 | 2.5 | 2.5 |
| Ferric oxide | 15 | — | 15 | — |

TABLE 3

| Sample No. | 21 | 22 | 23 | 24 |
|---|---|---|---|---|
| Start up voltage KV | 3.0 | 3.0 | 3.0 | 3.0 |
| Final voltage KV | 4.0 | 3.25 | 4.5 | 3.5 |
| Tracking voltage KV | non-tracking | 3.25 | 4.25 | 3.5 |
| Comments | Sample removed at 248 mins. due to distortion resulting from heat of spark | Tracked at 76 mins. | Sample failed by flaming. Erosion and several small tracks present. 392 mins. | Failed by tracking at 137 min. |

These results show the improved anti-tracking effects obtained using a system of the present invention in two different types of polymeric insulation.

EXAMPLE 5

Samples containing the following formulations were prepared and tested as described in Example 1. The results are shown in Table 4.

| Sample No. | 25 | 26 |
|---|---|---|
| Low density polythene (as in Example 1) | 200 | 200 |
| Ethylene ethyl acrylate copolymer (as in Example 1) | 40 | 40 |
| Alumina hydrate (Hydral 705) | 100 | 100 |
| Agerite Resin D | 2 | 2 |
| Trially cyanurate | 2 | 2 |
| 2,5 di methyl-2,5-di-tert.butyl peroxy hexyne-3 | 2.5 | 2.5 |
| Ferric oxide | 15 | — |

TABLE 4

| Sample No. | 25 | 26 |
|---|---|---|
| Start up Voltage kV | 3.0 | 3.0 |
| Final Voltage kV | 5.75 | 5.0 |
| Comments | Non-tracking. Sample removed after 704 mins. on test, showing only some erosion. | Flame failed with some indication of tracking. |

These results show the improved effect obtained using ferric oxide as component (b) in another type of polymeric insulation.

EXAMPLE 6

Samples containing the following formulations were prepared and tested as described in Example 1, except that the ammonium chloride had a resistivity of 330 ohm cm. (thus making the test slightly more severe).

| Sample No. | 27 | 28 | 29 | 30 | 31 | 32 |
|---|---|---|---|---|---|---|
| Dimethyl silicone elastomer (containing a small amount of methyl vinyl siloxane) | 30 | 30 | 30 | 30 | 30 | 30 |
| Low density polyethylene (MFI 3) | 30 | 30 | 30 | 30 | 30 | 30 |
| Ethylene ethyl acrylate copolymer (19% ethyl acrylate) | 30 | 30 | 30 | 30 | 30 | 30 |
| Alumina trihydrate (Hydral 705) | 30 | 30 | 30 | 30 | 30 | 30 |
| Agerite Resin D (antioxidant) | 2 | 2 | 2 | 2 | 2 | 2 |
| Calcined ferric oxide | 0 | 1 | 4 | 5 | 7½ | 10 |
| Triallyl cyanurate | 1 | 1 | 1 | 1 | 1 | 1 |
| 2,5 dimethyl 2,5 di tert. butyl peroxy hexyne-3 | 1 | 1 | 1 | 1 | 1 | 1 |

The results obtained were as follows:

| Sample Number | 27 | 28 | 29 | 30 | 31 | 32 |
|---|---|---|---|---|---|---|
| Starting voltage KV | 1.5 | 1.5 | 1.5 | 1.5 | 1.5 | 1.5 |
| Finishing voltage | 2.5 | 2.75 | 3.0 | 3.25 | 3.0 | 3.25 |
| Time to track 2" | 240 min. | — | — | — | — | — |

Samples 28–32 prepared in accordance with the present invention, were non-tracking and failed only by erosion after 320, 384, 428, 395 and 420 minutes, respectively. These figures illustrate that, where component (b) is ferric oxide, increasing the proportion does not result in increased tracking protection and only has a small effect, if any, on the erosion of the materials. However, with other oxides disclosed as operative in the invention larger proportions of the oxide may be required to obtain the desired anti-tracking properties in the insulation.

EXAMPLE 7

Three further compositions containing cobalt silicate, cobalt aluminate, and brown iron oxide, respectively, as component (b) were prepared and tested as described in Example 1.

|  | Pts. |
|---|---|
| Dimethyl silicone elastomer (containing 0.2 mole % of methyl vinyl siloxane) | 30 |
| Low Density polythene (MFI 3.0) | 30 |
| Ethylene ethyl acrylate copolymer (18% ethyl acrylate) | 30 |
| Alumina trihydrate (surface are 6.3 m²/g.) | 30 |
| Agerite Resin D | 2 |
| Component (b) as in Table | 5 |
| Triallyl cyanurate | 1 |
| 2,5 dimethyl 2,5 di tert. butyl peroxy hexyne -3 | 0.5 |

The starting voltage was 3 KV and the following results were obtained.

TABLE 5

| Sample No. | Component (b) | Final Voltage KV | Comments |
|---|---|---|---|
| 33 | Blue cobalt silicate (about 32% cobalt) | 5.5 | Sample removed at 647 mins. no tracking only slight erosion |
| 34 | Blue cobalt aluminate (32% cobalt) | 5.25 | Non-tracking, sample removed at 569 mins. deeply eroded |
| 35 | Brown iron oxide (Ref 645T ex Bayer) | 3.75 | Sample eroded through at base after 180 mins. |

EXAMPLE 8

These experiments illustrate the importance of the surface area of the alumina hydrate. The following formulations were prepared as described in Example 1.

|  | Pts |
|---|---|
| Dimethyl silicone elastomer (containing 0.2 mole % of methyl vinyl siloxane) | 30 |
| Low density polythene (M.F.I. 2.0) | 30 |
| Ethylene ethyl acrylate copolymer (18% ethyl acrylate) | 30 |
| Alumina trihydrate (surface area as in Table 6) | 30 |
| Agerite Resin D | 2 |
| Ferric oxide | 5 |
| Triallyl cyanurate | 2.0 |
| 2,5 dimethyl 2,5 di tert butyl peroxy hexyne -3 | 0.5 |

Test samples were tested as described in Example 1 but at a constant voltage of 3 KV, so that the time to track or erode at this voltage was determined. The results are presented in Table 6.

TABLE 6

| Sample No. | Surface area of hydrate m²/g | Comments |
|---|---|---|
| 36 | 0.5 | Tracked at 24 mins. |
| 37 | 1.8 | Tracked at 58 mins. |
| 38 | 2.1 | Sample eroded with some small tracks at 65 mins. |
| 39 | 3.7 | Sample eroded through at 181 mins. |
| 40 | 4.8 | Sample eroded through at 166 mins. |
| 41 | 5.0 | Sample eroded at 195 mins. |
| 42 | 6.3 | Sample eroded at 200 mins. |
| 43 | 10.5 | Sample eroded at 360 mins. |
| 44 | 12.3 | Sample removed at 494 mins. approximately ¼ thickness left. |
| 45 | 16 | Sample removed at 523 mins approximately ¼ thickness left intact |

The above results show quite clearly that hydrates having a surface area below about 2.0 m²/g do not prevent tracking, while, surprisingly, materials containing hydrates of about 2.0 m²/g or higher surface area fail by erosion only. Although the mechanism by which alumina hydrates with a surface area above about 2.0 m²/g combine synergistically with the disclosed metal oxides is unknown, Table 6 clearly discloses that where the surface area is about 2.0 m²/g or over the hydrates confer increasing resistance to erosion as their surface area increases.

The surface areas were measured by the BET technique on a Micromeritics Surface Area Analyzer Model 2200 after initially degassing the samples for 40 minutes at 150° C.

EXAMPLE 9

This Example illustrates compositions based on various other polymers.

The following formulations were prepared and tested as described in Example 1.

| Sample No. | 46* | 47* | 48 | 49 | 50 | 51 |
|---|---|---|---|---|---|---|
| Polyethylene (MFI 3.0) | — | — | 100 | 100 | — | — |
| Ethylene/propylene copolymer 30% propylene) | — | — | — | — | 100 | 100 |
| Polydimethyl Siloxane | 100 | 100 | — | — | — | — |
| Aerosil 200 (Fine particle size silica) | 30 | 30 | — | — | — | — |
| Alumina trihydrate Surface Area 6.3 m²/g) | 30 | 30 | 20 | 20 | 50 | 50 |
| Ferric Oxide | — | 5 | — | 20 | — | 5 |
| Triallyl cyanurate | 2 | 2 | 2 | 2 | 2 | 2 |
| 2,5-dimethyl-2,5-ditertiarybutyperoxy-hexane-3 | 1 | 1 | 1 | 1 | 2.5 | 2.5 |

*Substantially identical results were obtained using a copolymer of dimethyl siloxane and 0.2 mole % methyl vinyl siloxane in place of pure polydimethyl siloxane.

The following results were obtained:

TABLE 7

| Sample No. | Starting Voltage | Final Voltage | Comments |
|---|---|---|---|
| 46* | 1.5 kV | 2.25 kV | Complete failure by tracking |
| 47* | 1.5 kV | 2.75 kV | Failed by erosion |
| 48 | 1.5 kV | 2.5 kV | Sample failed by several tracks and flame failure after 243 minutes |
| 49 | 1.5 kV | 2.75 kV | Sample failed by erosion after 310 minutes |
| 50 | 1.5 kV | 2.5 kV | Sample failed by deep tracking erosion and flame failure after 280 minutes |
| 51 | 1.5 kV | 2.75 kV | Sample failed by erosion after 319 minutes |

*Substantially identical results were obtained using a copolymer of dimethyl siloxane and 0.2 mole % methyl vinyl siloxane in place of pure polydimethyl siloxane.

EXAMPLE 10

This example illustrates the use of oxides of the lanthanide and actinide series.

The following formulations were prepared and tested as in Example 1.

| Sample No. | 52 Comparison | 53 | 54 | 55 |
|---|---|---|---|---|
| Dimethyl siloxane elastomer (containing 0.2 mole % methyl vinyl siloxane) | 30 | 30 | 30 | 30 |
| Low density polythene (MFI 3.0) | 30 | 30 | 30 | 30 |
| Ethylene/ethylacrylate copolymer (as in Example 1) | 30 | 30 | 30 | 30 |
| Alumina trihydrate (surface area 6.3 m$^2$/g.) | 30 | 30 | 30 | 30 |
| Agerite Resin D | 2 | 2 | 2 | 2 |
| $UO_3$* | — | 5 | — | — |
| $Pr_6O_{11}$* | — | — | 5 | — |
| $Ce_2O_3$* | — | — | — | 5 |
| Triallyl cyanurate | 1 | 1 | 1 | 1 |
| 2,5-dimethyl-2,5 di-t-butyl peroxy hexyne-3 | 0.5 | 0.5 | 0.5 | 0.5 |

*Purities were 99.9 + %

The ASTM test was commenced at 3.0 kV and the following results were obtained.

TABLE 8

| Sample No. | Final Voltage | Comments |
|---|---|---|
| 52 Comparison | 3.25 kV | Tracked at 69 minutes |
| 53 | 3.75 kV | Eroded and tracked at 183 minutes |
| 54 | 3.25 kV | Wide erosion sample tracked at 89 minutes |
| 55 | 3.50 kV | Severe erosion and slight tracking after 160 minutes |

The above figures show that, although in general the results obtained using these oxides are not so good as those obtained using transition metal oxides, there is a definite improvement in anti-tracking properties when compared to the use of alumina trihydrate alone.

EXAMPLE 11

This example illustrates the use of thorium oxide.

The formulations were prepared and tested as in Example 1, except that the ammonium chloride had a resistivity of 385 ohm cms., thus making the test slightly less severe.

| Sample Number | 56* | 57* | 58** | 59**/60* |
|---|---|---|---|---|
| I.C.I. Silicone Elastomer E 322/60 | 30 | 30 | 30 | 30 |
| L.D. polyethylene, MFI 3.0 | 30 | 30 | 30 | 30 |
| Ethylene-ethyl acrylate copolymer (18% ethyl acrylate) | 30 | 30 | 30 | 30 |
| Alumina trihydrate | 30 | 30 | 30 | 30 |
| Thorium oxide, $ThO_2$ | 20 | 60 | 10 | — |
| Agerite Resin D | 2 | 2 | 2 | 2 |
| Triallyl cyanurate | 1 | 1 | 1 | 1 |
| 2,5 dimethyl 2,5 di tert. butyl peroxy hexyne-3 | 1 | 1 | 1 | 1 |

*Alumina trihydrate surface area was 11.1 m$^2$/g.
**Alumina trihydrate surface area was 6.44 m$^2$/g.

The ASTM test was commenced at 2.5 KV, and the following results were obtained.

TABLE 9

| Sample Number | 56 | 57 | 58 | 59/60 |
|---|---|---|---|---|
| Start up voltage KV | 2.5 | 2.5 | 2.5 | 2.5 |
| Final voltage KV | 2.75 | 2.5 | 2.75 | 2.75 |
| Tracking voltage KV | 2.75 | 2.5 | 2.75 | 2.75 |
| Time to track 2" (minutes from start of test) | 101 | 28 | 70 | 72/75 |
| Comments: | Started to track at 17 mins., but cleaned up, to fail by eroded track. | Tracking started at 14 min. | Single carbon track formed | Tracking started after 10 mins. |

The test results in Table 9 demonstrate that thorium oxide performs according to the invention. Best results with thorium oxide are obtained by using alumina hydrate of a fairly high surface area and a moderate amount of the oxide. It is preferable to avoid use of the oxide in large quantities.

EXAMPLE 12

This example further illustrates the use of oxides and mixtures of oxides in the lanthanide series.

The following formulations were prepared and tested as in Example 1, except that the ammonium chloride had a resistivity of 385 ohm cms., thus, making the test slightly less severe.

| Sample Number | 61a | 62a | 63a | 64a | 65a | 66 |
|---|---|---|---|---|---|---|
| I.C.I. Silicone Elastomer E 322/60 | 30 | 30 | 30 | 30 | 30 | 30 |
| L.D. Polyethylene, MFI 3.0 | 30 | 30 | 30 | 30 | 30 | 30 |
| Ethylene-ethyl acrylate copolymer (18% ethyl acrylate) | 30 | 30 | 30 | 30 | 30 | 30 |
| Alumina trihydrate (surface area-10.2 m$^2$/g) | 30 | 30 | 30 | 30 | 30 | 30 |
| Holmium oxide | — | 5 | — | — | — | — |
| Praeseodymium oxide $Pr_6O_{11}$[1] | — | — | 5 | — | — | — |
| Ytterbium oxide[1] | — | — | — | 5 | — | — |
| Erbium oxide[1] | — | — | — | — | 5 | — |
| Cerium oxide[2] | — | — | — | — | — | 5 |
| Agerite Resin D | 2 | 2 | 2 | 2 | 2 | 2 |
| Triallyl cyanurate | 1 | 1 | 1 | 1 | 1 | 1 |
| 2,5 di methyl 2,5 di tert. butyl peroxy hexyne-3 | 1 | 1 | 1 | 1 | 1 | 1 |

[1]Purities were 99.9 + %
[2]Commercial grade sample of 50% cerium oxide with the remainder being oxides of all other lanthanide elements.

Samples 61b–65b correspond to samples 61a–65a respectively and were prepared from the same components in the same amounts except that the alumina trihydrate had a surface area of 5.8 m$^2$/g.

The ASTM test was commenced at 2.5 KV. The results are presented in Table 10.

TABLE 10

| Sample No. | Final voltage, KV | Tracking voltage, KV | Time to track 2" (mins. from start of test) | Comments |
|---|---|---|---|---|
| 61a (Comparison) | 3.0 | 2.5 | 147 | Tracking started at 20 mins. Several tracks were evident by 120 mins. which later joined together producing final failure. |

TABLE 10-continued

| Sample No. | Final voltage, KV | Tracking voltage, KV | Time to track 2" (mins. from start of test) | Comments |
|---|---|---|---|---|
| 62a | 3.5 | 3.25 | 270 | Erosion started at 82 mins. Later large eroded crater formed, which progressed to top electrode with some tracking. |
| 63a | 3.5 | 3.25 | 294 | Erosion started at 13 mins. Large eroded crater formed and ultimate failure was by single carbon track from top of crater. |
| 64a | 3.5 | 3.5 | 253 | Erosion started at 55 mins. Large eroded crater formed and failure was by tracking with very large eroded crater at bottom electrode. |
| 65a | 3.25 | 3.0 | 239 | Erosion started at 81 mins. Failure due to large eroded crater with single track at top. |
| 66 | 3.5 | 3.25 | 294 | Erosion started at 33 mins. Failure due to eroded crater with single carbon track at top. |
| 61b (Comparison) | 2.75 | 2.5 | 62 | Tracking started after 10 mins. |
| 62b | 3.0 | 3.0 | 175 | Initially some erosion, but this turned to a single carbon track. |
| 63b | 3.0 | 3.0 | 176 | Erosion started at 15 mins. Later several carbon tracks started eventually going up, causing failure. |
| 64b | 3.0 | 3.0 | 147 | Erosion initially but carbon tracks formed which linked up to one single track. |
| 65b | 3.25 | 3.0 | 191 | Failure due to carbon tracks after small eroded crater formed. |

The test result in Table 10 demonstrate that the lanthanide oxides act synergistically, even at low surface areas, with alumina hydrate, giving increased resistance to tracking over alumina hydrate alone.

The test results in Table 10 may be advantageously compared with those presented in Example 8 to demonstrate that the surface area of the alumina trihydrate similarly affects the degree of anti-tracking resistance imparted to electrical insulators by all of the oxides and mixed oxides disclosed as operative in the invention. Thus, as shown in Example 8, with iron oxide, the time for erosion failure increases from 166 through 360 to 523 minutes as the surface area of the alumina hydrate is increased from 3.7 through 10.5 to 16 $m^2/g$. Similarly, in the case of ytterbium, the time for erosive failure increases from 147 to 253 minutes as the surface area is increased from 5.8 to 10.2 $m^2/g$.

In contrast, the effect of surface area variations in the alumina trihydrate when the latter is used alone appears to be minimal, as can be seen from the following Table drawn up from the comparative samples tested and reported elsewhere in this specification.

TABLE 10a

| Sample | Surface Area $m^2/g$ | Time to track 2" |
|---|---|---|
| 61b | 5.8 | 62 |
| 52 | 6.3 | 69 |
| 59 | 6.44 | 72 |
| 61a | 10.2 | 147 |
| 69 | 10.9 | 30 |
| 60 | 11.1 | 75 |
| 3 | 16 | 69 |

Table 10a allowing for two apparently anomalous results, indicates that, in the absence of an additional filler in accordance with the present invention, the anti-tracking properties are virtually independent of the surface area of the alumina trihydrate and, implicitly, indicates a synergistic relationship between such fillers and the said surface area.

EXAMPLE 13

This example compares the effectiveness of a composition employing a metal oxide within the scope of the invention (calcined ferric oxide) with that of a metal oxide outside the scope of the invention (zinc oxide).

The following formulations were prepared and tested as described in Example 1.

| Sample No. | 67 | 68 | 69 |
|---|---|---|---|
| ICI Silicone Elastomer E 322/60 | 30 | 30 | 30 |
| LD polyethylene, MFI 3.0 | 30 | 30 | 30 |
| Ethylene-ethyl acrylate copolymer-18% ethyl acrylate | 30 | 30 | 30 |
| Alumina trihydrate (surface are 10.9 $m^2/g$) | 30 | 30 | 30 |
| Agerite Resin D | 2 | 2 | 2 |
| Zinc Oxide | — | 5 | — |
| Calcined ferric oxide | 5 | — | — |
| Triallyl cyanurate | 1 | 1 | 1 |
| 2,5 dimethyl 2,5 di tert. butyl peroxy hexyne-3 | 1 | 1 | 1 |

The results obtained are reported in Table 11 below.

| Sample No. | 67 | 68 | 69 |
|---|---|---|---|
| Start up voltage KV | 3.0 | 3.0 | 3.0 |
| Final voltage KV | 3.25* | 3.25 | 3.0 |
| Tracking voltage KV | non-tracking | 3.25 | 3.0 |
| Time to track 2" (minutes from start of test) | | 80 | 30 |
| Comments: | *Sample failed at 119 mins. by catching fire | Deep eroded track between electrodes. | Sample started tracking |

| | | |
|---|---|---|
| Sample No. | 67 | 68 | 69 |
| | at edge of sample. No tracking occurred. | Tracking commenced within 10 mins. of voltage application. | immediately voltage applied. |

The above figures clearly show that the use of zinc oxide with alumina hydrate does not prevent tracking failure of the insulating material whereas the use of ferric oxide in the place of zinc oxide in an otherwise identical formulation completely eliminates tracking failure. Although sample 68, containing zinc oxide, took longer to fail by tracking than control sample 69, containing alumina hydrate alone, failure of sample 68 was still a tracking failure. This demonstrates that zinc oxide does not act synergistically with alumina trihydrate to give vastly improved resistance to tracking failure as do the oxides and mixed oxides of the invention.

EXAMPLE 14

This Example illustrates the use of the insulation materials of the present invention in heat-recoverable articles.

Using a formulation as specified in Example 1, Sample 1, a shed of internal diameter 0.49 inches was prepared by moulding at 190° C. for 12 minutes. After moulding, the shed was cooled in water, trimmed and then heated in a glycerine bath at 170° C. for 3 minutes. A PTFE mandrel of diameter 1.1 inches was then forced through the shed and then the mandrel plus shed was cooled in cold water for 5 minutes, whereupon the mandrel was removed. The shed then had an internal diameter of 1.05 inches. It was pore free. It was then reheated with a hot air gun to 170° C. whereupon it shrank and completely recovered to an internal diameter of 0.49 inches.

Similar results were obtained with a larger shed of internal diameter 1.05 inches which was expanded to 2.2 inches, and then completely recovered.

Using the same formulation, but with the peroxide absent, tubing of the following dimensions was prepared by extrusion.
Internal diameter: 0.475 inches
Wall thickness: 0.095 inches The tubing was irradiated using a 1.5 mev electron beam to a total dose of 12 megarads. The tubing had the following properties.

| | 23° C. | 150° C. |
|---|---|---|
| Tensile Strength | 101.3 Kg/cm$^2$ | 15.3 Kg/cm$^2$ |
| Elongation at break | 416% | 293% |
| 100% Modulus | — | 6.8 Kg/cm$^2$ |

This tubing was then expanded in a Raychem tubing expander of the type described and claimed in British Pat. No. 990,235 at a temperature of 140° C. The tubing obtained had an internal diameter of 1.10 inches. On heating, the tubing immediately recovered to its original internal diameter.

The tubing and sheds described above were successfully utilized to form a support insulator of the type described in British Pat. No. 1,292,276.

An epoxy polyamide/bisphenol A resin system was used as adhesive.

I claim:

1. Electrically insulating material suitable for high voltage applications which comprises one or more polymers and from about 29% to about 75% by weight of an anti-tracking filler system comprising: (a) a hydrate of alumina having a specific surface area of at least about 2 M$^2$/g, measured by the BET method, and (b) a compound selected from the group consisting of oxides, mixed oxides, and mixtures of oxides, wherein said compound contains at least one element selected from the group consisting of transition series elements, lanthanide series elements, and nontransuranic actinide series elements, components (a) and (b) being present in said anti-tracking filler system in amounts such that said electrically insulating material has an initial tracking voltage of at least about 2.5 kilovolts when tested according to ASTM-D 2303-68 liquid Contaminant Inclined Plane test.

2. An electrically insulating material as claimed in claim 1 wherein said element is selected from the group consisting of titanium, zirconium, hafnium, vanadium, niobium, tantalum, chromium, molybdenum, tungsten, manganese, rhenium, iron, cobalt, nickel, ruthenium, rhodium, palladium, osmium, iridium, platinum, cerium, praseodymium, neodymium, promethium, samarium, europium, gadolinium, terbium, dysprosium, helmium, erbium, thulium, ytterbium, lutetium, thorium, and uranium.

3. An electrically insulating material as claimed in claim 1, wherein the hydrate of alumina is the trihydrate, $Al_2O_3.3H_2O$.

4. An electrically insulating material as claimed in claim 3, wherein the specific surface area of the alumina hydrate is at least 3 m$^2$/g.

5. An electrically insulating material as claimed in claim 4, wherein the specific surface area of the alumina hydrate is at least 6 m$^2$/g.

6. An electrically insulating material as claimed in claim 3, wherein the specific surface area of the alumina hydrate lies in the range of from about 8 to about 20 m$^2$/g.

7. An electrically insulating material as claimed in claim 4, wherein the maximum particle size of the alumina hydrate is less than about 4 microns.

8. An electrically insulating material as claimed in claim 7, wherein the maximum particle size of the alumina hydrate is less than about 2 microns.

9. An electrically insulating material as claimed in claim 1, wherein the alumina hydrate is alumina trihydrate having 100% by weight of its particles of a size less than 2 microns, 99.5% of size less than 1 micron, 60 of size less than 0.5 micron and a specific surface area substantially in the range of from about 12 to about 15 m$^2$/g.

10. An electrically insulating material as claimed in claim 1, wherein component (b) of the anti-tracking filler system contains a transition metal selected from the group consisting of titanium, zirconium, hafnium, vanadium, niobium, tantalum, chromium, molybdenum, tungsten, manganese, rhenium, iron, cobalt, nickel, ruthenium, rhodium, palladium, osmium, iridium, platinum.

11. An electrically insulating material as claimed in claim 10, wherein the transition metal is selected from the group consisting of iron, cobalt and chromium.

12. An electrically insulating material as claimed in claim 11, wherein component (b) is ferric oxide.

13. An electrically insulating material as claimed in claim 11, wherein component (b) is chromic oxide.

14. An electrically insulating material as claimed in claim 11, wherein component (b) is selected from the group consisting of $Co_2O_3$ and $Co_3O_4$.

15. An electrically insulating material as claimed in claim 11, wherein component (b) is a mixture of ferric and cobaltic oxides.

16. An electrically insulating material as claimed in claim 10, wherein component (b) is blue cobalt silicate.

17. An electrically insulating material as claimed in claim 10, wherein component (b) is blue cobalt aluminate.

18. An electrically insulating material as claimed in claim 1, wherein the anti-tracking filler system comprises from about 20 to about 35% of the total weight of the insulating material.

19. An electrically insulating material as claimed in claim 1, wherein the anti-tracking filler system comprises from about 30 to about 60% of the total weight of the insulating material.

20. An electrically insulating material as claimed in claim 1, wherein component (b) comprises from 2 to 10% by weight of the total weight of the electrically insulating material.

21. An electrically insulating material as claimed in claim 1, wherein component (b) comprises from 3 to 5% by weight of the total weight of the electrically insulating material.

22. An electrically insulating material as claimed in claim 1, wherein component (b) has a particle size less than 75 microns.

23. An electrically insulating material as claimed in claim 22, wherein component (b) has a particle size less than 45 microns.

24. An electrically insulating material as claimed in claim 1, wherein the polymer component is selected from the group consisting of polyethylene, an ethylene/ethylacrylate copolymer, an ethylene/vinyl acetate copolymer, an ethylene/propylene copolymer, an ethylene/propylene/non-conjugated-diene terpolymer, a chlorosulphonated polyethylene, polypropylene, polydimethyl siloxane, a dimethyl siloxane/methyl vinyl siloxane copolymer, a fluorosilicene, a carborane siloxane, polybutylacrylate, a butylacrylate/ethylacrylate copolymer, a butylacrylate/acrylonitrile copolymer, a butylacrylate/glycidyl methacrylate copolymer, polybutene, a butyl rubber, an ionomer and mixtures thereof.

25. An electrically insulated material as claimed in claim 24, wherein the polymer component is a mixture of a dimethyl silicone elastomer, a low density polyethylene and an ethylene/ethyl acrylate copolymer.

26. Electrically insulating material as claimed in claim 1 wherein the polymers have been cross-linked.

27. An electrical component which is insulated by material as claimed in claim 26.

28. An electrical component as claimed in claim 27, which is a high voltage cable.

29. A shaped article which comprises insulating material as claimed in claim 1.

30. A shaped article as claimed in claim 29, which is heat-recoverable.

31. The insulating material of claim 1 further including up to about 3% by weight of carbon black.

32. The material of claim 1 wherein said element is selected from the group consisting of titanium, vanadium, chromium, iron, cobalt, nickel, niobium, molybdenum, lanthanum, tungsten, cerium, praeseodymium, holmium, erbium, ytterbium, thorium and uranium.

33. The electrically insulating material of claim 25 wherein the specific surface area of the hydrate of alumina is at least 4.0 m$^2$/g and at least one component of the group of oxides, mixed oxides and mixtures of oxides is selected from the group consisting of ferric oxide, chromium oxide, cobaltic oxide, cobaltic aluminate, titanium dioxide, and cobaltous oxide.

34. The electrically insulating material of claim 25 wherein the antitracking filler system comprises from about 20 to about 35% of the total weight of the insulating material.

35. An electrically insulating material as claimed in claim 1 wherein the polymer component is selected from the group consisting of, dimethyl silicone, polyethylene, ethylene ethyl acrylate, ethylene propylene-ethylidene norbornene terpolymer, polyethylene and ethylent ethyl acrylate copolymer, ethylene-propylene copolymer, polydimethyl siloxane, dimethylsilicone, methyl vinyl siloxane, dimethyl siloxane, methyl vinyl siloxane copolymers and mixtures thereof.

36. The electrically insulating material of claim 33 wherein at least one component of the oxides, mixed oxides and mixtures of oxides is selected from the group consisting of oxides of iron, nickel, cobalt, chromium, vanadium, titanium, molybdenum, tungsten, niobium, uranium, praseodymium, cerium, thorium, holmium, ytterbium, and erbium.

37. An electrically insulating material as claimed in claim 36, wherein the polymer component is a mixture of a dimethyl silicone elastomer, polyethylene and an ethylene/ethyl acrylate copolymer.

38. An electrically insulating material as claimed in claim 37 wherein at least one component of the oxides, mixed oxides, and mixtures of oxides is selected from the group consisting of oxides of iron, nickel, cobalt, chromium, vanadium, titanium, molybdenum, tungsten, niobium, uranium, praseodymium, cerium, thorium, holmium, ytterbium, and erbium.

39. The electrically insulating material of claim 1 wherein the polymer is a thermoplastic polymer.

40. The electrically insulating material of claim 1 wherein the polymer is an elastomeric polymer.

* * * * *